US010521321B2

(12) United States Patent
Jong et al.

(10) Patent No.: US 10,521,321 B2
(45) Date of Patent: Dec. 31, 2019

(54) DIVERSE REDUNDANCY APPROACH FOR SAFETY CRITICAL APPLICATIONS

(71) Applicant: QUALCOMM Incorporated, San Diego, CA (US)

(72) Inventors: Alex Kwang Ho Jong, San Diego, CA (US); Jay Chunsup Yun, Carlsbad, CA (US); Donghyun Kim, San Diego, CA (US); Rahul Gulati, San Diego, CA (US); Brendon Lewis Johnson, San Diego, CA (US); Andrew Evan Gruber, Arlington, MA (US)

(73) Assignee: QUALCOMM Incorporated, San Diego, CA (US)

( * ) Notice: Subject to any disclaimer, the term of this patent is extended or adjusted under 35 U.S.C. 154(b) by 126 days.

(21) Appl. No.: 15/850,967

(22) Filed: Dec. 21, 2017

(65) Prior Publication Data

US 2019/0196926 A1     Jun. 27, 2019

(51) Int. Cl.
| | |
|---|---|
| *G06F 11/00* | (2006.01) |
| *G06F 11/277* | (2006.01) |
| *G06T 1/20* | (2006.01) |
| *G06T 7/00* | (2017.01) |
| *G06F 11/22* | (2006.01) |

(52) U.S. Cl.
CPC ........ *G06F 11/277* (2013.01); *G06F 11/2236* (2013.01); *G06T 1/20* (2013.01); *G06T 7/0002* (2013.01); *G06T 7/97* (2017.01); *G06T 2207/30168* (2013.01)

(58) Field of Classification Search
CPC .. G06F 11/277; G06F 11/2236; G06T 7/0002; G06T 1/20; G06T 7/97; G06T 2207/30168

USPC .......................................................... 714/32
See application file for complete search history.

(56) References Cited

U.S. PATENT DOCUMENTS

| | | | |
|---|---|---|---|
| 7,659,903 | B2 | 2/2010 | Hedrick et al. |
| 7,724,259 | B2 | 5/2010 | Hedrick et al. |
| 8,111,920 | B2 | 2/2012 | Block et al. |
| 8,448,067 | B2 | 5/2013 | Cerny et al. |
| 8,913,846 | B2 | 12/2014 | Charvet et al. |
| 2013/0135329 | A1 | 5/2013 | Seetharamaiah et al. |
| 2014/0085324 | A1* | 3/2014 | Charvet ................ G06T 7/0004 345/589 |
| 2015/0371611 | A1* | 12/2015 | Raley ...................... G06F 21/10 345/629 |
| 2016/0379332 | A1 | 12/2016 | Krutsch et al. |
| 2016/0379381 | A1* | 12/2016 | Krutsch ................ G06T 11/001 345/426 |
| 2017/0004647 | A1* | 1/2017 | Grossman ................ G06T 1/60 |
| 2018/0082464 | A1* | 3/2018 | Akenine-Moller .......................... G06T 15/005 |

(Continued)

OTHER PUBLICATIONS

International Search Report and Written Opinion—PCT/US2018/062898—ISA/EPO—dated Mar. 7, 2019.

*Primary Examiner* — Yair Leibovich
(74) *Attorney, Agent, or Firm* — Shumaker & Sieffert, P.A.

(57) ABSTRACT

A graphics processing unit (GPU) of a GPU subsystem of a computing device operates in a first rendering mode to process graphics data to produce a first image. The GPU operates in a second rendering mode to process the graphics data to produce a second image. The computing device detects whether a fault has occurred in the GPU subsystem based at least in part on comparing the first image with the second image.

27 Claims, 4 Drawing Sheets

(56) References Cited

U.S. PATENT DOCUMENTS

2019/0043455 A1\* 2/2019 Davidson ................ G06F 11/36
2019/0087985 A1\* 3/2019 Li .......................... G06T 11/006
2019/0197651 A1\* 6/2019 Johnson .................... G06T 1/60

\* cited by examiner

DIVERSE REDUNDANCY APPROACH FOR SAFETY CRITICAL APPLICATIONS

TECHNICAL FIELD

The disclosure relates to the testing of a graphics processing unit (GPU) subsystem for safety critical applications.

BACKGROUND

Graphics processing units (GPUs) are processing circuits configured to perform many operations in parallel and are useful for graphics operations that generate image data for display. GPUs are used in a variety of environments including automobiles. For instance, a GPU generates image content, such as image content displayed on an instrument panel behind the steering wheel, image content used as warning indicators, image content related to infotainments screens, image content from a rearview camera, and other image content for other automotive display systems. A display device in an automobile may be part of, or operably coupled to, an automotive advanced driver assistance system (ADAS) such that the display device may also display blind spot warnings to alert the driver that there are vehicles situated at the driver's blind spot.

A safety critical ADAS may be required to fulfill functional safety requirements, such as those mandated by ISO 26262 (functional safety standard for road vehicles). One functional safety requirement is to ensure data content integrity for image data that are to be displayed by a display device. A failure to display correct image data may lead to a violation of defined safety goals for an automotive application. Example automotive applications that may use displays include a rear-view camera system, front collision warning systems, traffic sign recognition systems, parking assistance systems, instrument clusters, and the like.

SUMMARY

In general, aspects of the disclosure are directed to techniques for ensuring the data content integrity of a GPU subsystem. In certain applications, for example, if the GPU subsystem generates output data for an automotive advanced driver assistance system (ADAS) or a flight control system for controlling an aircraft, the integrity of the GPU subsystem may be especially important to maintaining the safety of the driver and passengers of the vehicle.

The GPU subsystem may perform graphics processing operations to render images to be displayed at a display device operably coupled to the ADAS or flight control system. Due to transient or permanent failures in the hardware of the GPU subsystem, the GPU subsystem may not necessarily generate correct output.

If the GPU subsystem introduces errors into images during such processing, then the user may not be able to rely on the accuracy of the images that are displayed by the display device. In the example of the display device that displays the video captured by the rear-view camera, the GPU subsystem may impact the safety of the driver and passengers, as well as pedestrians and occupants of other vehicles in a negative fashion if the GPU subsystem malfunctions.

In general, the techniques of this disclosure include performing the same graphics operation twice (e.g., an operation for rendering or generally producing an image) using a graphics processing unit (GPU), while the GPU operates in two different rendering modes. The results of performing the graphics operations (e.g., intermediate results and/or the final image) may then be compared to determine whether the results are different. If so, the computing device may identify an error in the GPU subsystem and issue a warning (e.g., an interrupt).

In one aspect, the disclosure is directed to a method for testing of a graphics processing unit (GPU) subsystem of a computing device. The method includes processing, by a GPU operating in a first rendering mode, graphics data to produce a first image. The method further includes processing, by the GPU operating in a second rendering mode, the graphics data to produce a second image. The method further includes determining whether a fault has occurred in the GPU subsystem based at least in part on comparing the first image with the second image.

In another aspect, the disclosure is directed to an apparatus for graphics processing. The apparatus includes a graphics processing unit (GPU) subsystem that comprises one or more memories and a GPU in communication with the one or memories. A GPU subsystem comprises the one or more memories, the GPU, and the one or more buses, the GPU being configured to: operate in a first rendering mode to process graphics data to produce a first image; store the first image in the one or more memories; operate in a second rendering mode to process the graphics data to produce a second image; store the second image in the one or more memories; and determine whether a fault has occurred in the GPU subsystem based at least in part on comparing the first image with the second image.

In another aspect, the disclosure is directed to an apparatus configured for graphics processing. The apparatus includes means for operating in a first rendering mode to process graphics data to produce a first image. The apparatus further includes means for operating in a second rendering mode to process the graphics data to produce a second image. The apparatus further includes means for determining whether a fault has occurred based at least in part on comparing the first image with the second image.

In another aspect the disclosure is directed to a computer-readable storage medium storing instructions that, when executed, causes one or more processor to: operate in a first rendering mode to process graphics data to produce a first image; operate in a second rendering mode to process the graphics data to produce a second image; and determine whether a fault has occurred based at least in part on comparing the first image with the second image.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
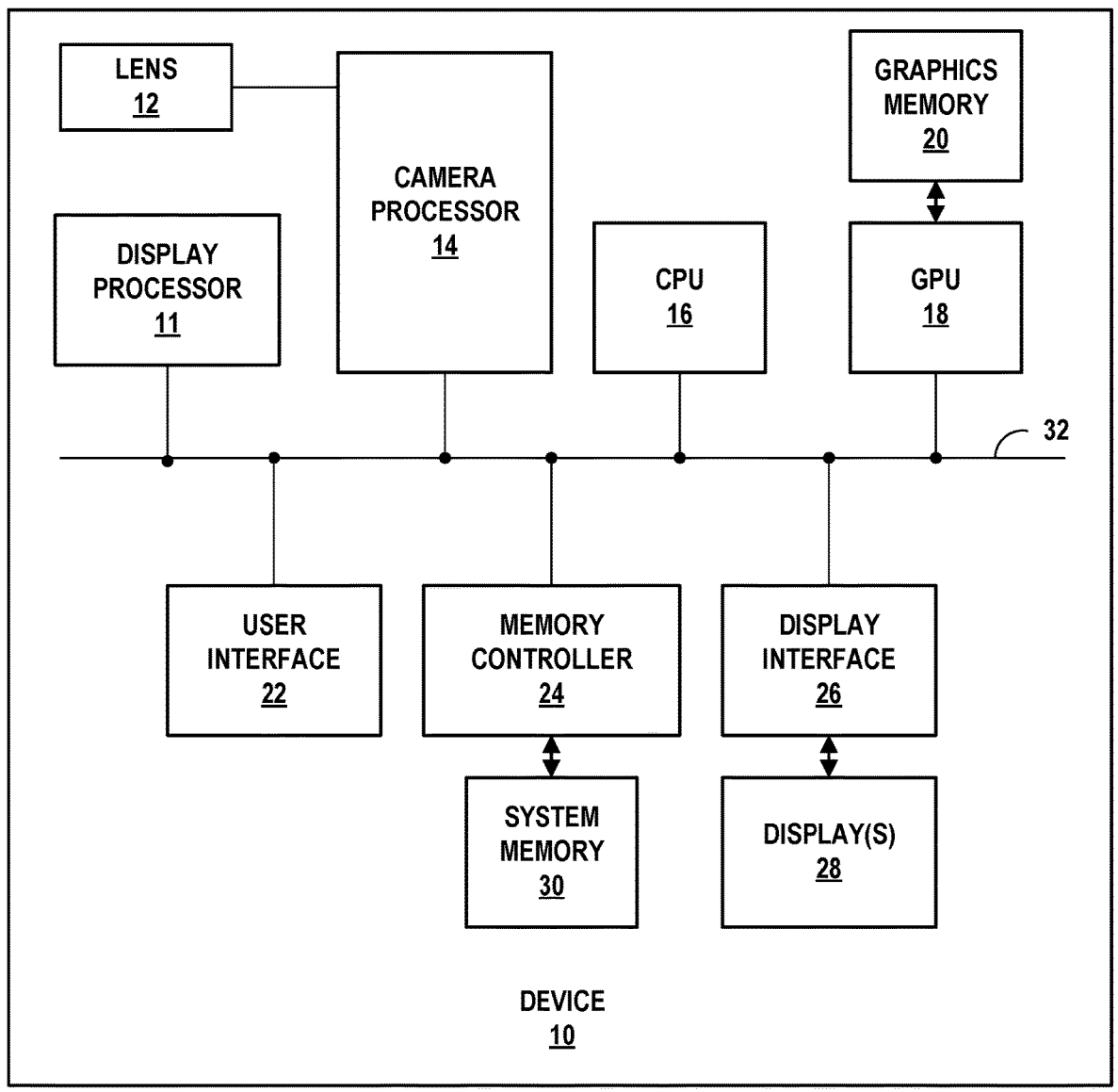
FIG. 1 is a block diagram illustrating an example computing device 10 that may be configured to implement techniques of this disclosure.

Examples of this disclosure are directed to techniques, structures, and devices for ensuring the hardware, memory, and data content integrity of a GPU subsystem by detecting operational faults of the GPU subsystem using a diverse redundancy approach. The GPU of the GPU subsystem may perform the same graphics operation twice (e.g., an operation for rendering or generally producing an image) to render images while it is operating in different rendering modes. The computing device may compare the rendered images generated by the GPU subsystem, and may determine that a fault has occurred in the GPU subsystem if the rendered images generated by the GPU subsystem do not match. The techniques of this disclosure may have application in automotive display systems, avionics display systems, or any other GPU subsystem where it may be beneficial to ensure that the image data intended to be displayed is actually displayed.

A computing device configured to perform the techniques of this disclosure may perform concurrent and online testing of its GPU subsystem to detect operational faults using the diverse redundancy approach. Concurrent testing of the GPU subsystem is a continuous testing of the GPU subsystem while the computing device is powered on. Online testing of the GPU subsystem includes testing of the GPU subsystem while the computing device and the GPU subsystem are powered on and performing its normal functionality.

In other words, the computing device may perform testing of the GPU subsystem while the computing device is powered on and in use for its normal operations by a user without entering into a dedicated test mode that prevents the user from using the computing device, and without switching off a display device that is included in or otherwise operably coupled to the computing device. Thus, if the computing device is an ADAS that includes rear view camera functionality, the user of the ADAS may use the ADAS to view video streamed from a rear-view camera of the vehicle while ADAS performs concurrent and online testing of the GPU subsystem.

Such concurrent and online testing of the GPU subsystem may detect operational faults of the GPU subsystem, which may include the GPU subsystem incorrectly rendering graphics data. Operational faults may include permanent faults, intermittent faults, and transient faults. Permanent faults may be faults that remain in existence indefinitely if no corrective action is taken. Such faults may be residual design or manufacturing faults. Intermittent faults may appear, disappear, and reappear repeatedly. Such faults may be difficult to predict but their effects may be highly correlated. When such intermittent faults appear, the GPU subsystem may work correctly most of the time but may fail under atypical environmental conditions. Transient faults may appear and disappear quickly, and such faults may not be correlated. Such transient faults are often induced by random environmental disturbances.

The GPU subsystem may include busses, memories, processors, and other hardware components that are used when rendering graphics data, such as the GPU, system memory, graphics memory, buses that operably couple such hardware components, and the like. For example, a GPU may communicate with memory via buses in order to read and write data to and from memory during the course of rendering an image. The GPU, memory, and buses that are used during the course of rendering the image may make up at least a portion of the GPU subsystem.

Currently available GPU subsystems may face several challenges with respect to its use for functional safety critical applications. One challenge is that error correcting code (ECC) memory and parity check mechanisms may be relatively expensive compared with non-ECC memory, and may have a relatively larger physical size compared with non-ECC memory. As such, ECC memory may not be optimized for computing devices where the cost and the physical size of its components may be an issue (e.g., in mobile computing devices).

Without ECC memory or parity check mechanisms, the GPU subsystem may not be able to detect transient or permanent faults in the GPU subsystem. Another challenge is the absence of built-in runtime diagnostics. Without built-in runtime diagnostics, there may be an inability to detect random logic errors during operation of the GPU subsystem. Another challenge is the dependence of the GPU subsystem on components outside of the GPU, such as buses that carry data between the GPU and memory, which may introduce a possibility of undetected failures. In addition, it may be costly and/or infeasible to add additional hardware components to detect all such failure modes at their source of entry.

As will be explained in more detail below, aspects of the present disclosure are directed to techniques, structures, and devices for ensuring data content integrity of a GPU subsystem that overcomes these and other challenges. A computing device may perform testing of its GPU subsystem to detect whether the hardware components and/or buses in the GPU subsystem introduces any errors into an image rendered by the GPU subsystem. Because the GPU subsystem may operate in different rendering modes to render graphics data, the GPU subsystem may operate in multiple, different rendering modes to detect operational faults of a GPU subsystem using a diverse redundancy approach. When operating in different rendering modes, the GPU subsystem may utilize different hardware components and busses in different ways. Thus, the computing device may be able to detect an operational fault in a component of the GPU subsystem when the GPU subsystem is operating in a rendering mode that it may not be able to detect when the GPU subsystem is operating in a different rendering mode.

In accordance with some aspects of the present disclosure, to perform testing of the GPU subsystem of a computing device, a GPU of the GPU subsystem of the computing device operates in a first rendering mode to process data to produce a first image (e.g., "render the first image"). The GPU operates in a second rendering mode, different from the first rendering mode, to process the data to produce a second image (e.g., "render the second image"). The data processed by the GPU to produce the first and second images may be graphics data used to render a frame comprising the first image or the second image. In other words, the GPU may process the same graphics data to produce the first image and the second image. The computing device detects whether a fault has occurred in the GPU subsystem based at least in part on comparing the first image with the second image.

How often the computing device performs testing of the GPU subsystem by having the GPU process the same graphics data twice while operating in two different rendering modes may vary based on various factors, such as the performance capabilities of the GPU, how the GPU is configured, and the like. In some examples, the computing device may perform testing of the GPU subsystem each time the GPU receives graphics data to be processed to produce an image. Thus, if the GPU is to render frames of a video at a rate of 30 frames per second (fps), the GPU may in fact perform rendering of the frames of the video at 60 fps by rendering each frame twice while operating in two different rendering modes, in order to render the frames of the video at a rate of 30 fps.

In another example, the GPU may not perform testing of the GPU subsystem each time the GPU receives graphics data. For example, if the GPU is to render frames of a video at 60 fps, the GPU may not be powerful enough to render each frame twice while operating in two different operating modes because rendering each frame of a 60 fps video twice may require the GPU to render frames of the video at a rate of 120 fps. In this case, the GPU may instead perform testing of the GPU subsystem every n-th frame. In the example where the GPU is to render frames of a video at 60 fps, the GPU may perform testing of the GPU subsystem once every $60^{th}$ frame of the video, rather than once every frame. To meet the requirement of rendering the video at the rate of 60 fps, GPU may render 61 frames a second, because the GPU may render 59 out of the 60 frames of the video once, and may render 1 frame out of the 60 frames of the video twice while operating in two different rendering modes.

One example rendering mode out of the different rendering modes in which a GPU subsystem operates is a tile-based rendering mode (also known as a binning rendering mode). When the GPU subsystem operates in tile-based rendering mode, the GPU subsystem renders an image as a representation of a 2D or 3D scene by breaking the image into smaller parts (e.g., rectangular bins or tiles) and rendering each of these bins separately. The tile-based rendering mode may be useful for GPU subsystems where little dedicated fast graphics memory is available, such as for GPU subsystems of mobile computing devices (e.g., mobile phones, wearable devices, etc.). The size of the tiles can be configured to represent the amount of data that is available in the graphics memory. For example, if the graphics memory is able to store 512 kB, the size of a tile may be configured so that that pixel data contained in that tile is less than or equal to 512 kB.

Another example rendering mode out of the different rendering modes in which a GPU subsystem operates is a direct rendering mode (sometimes called an immediate rendering mode). The direct rendering mode, unlike the tile-based rendering mode, does not break an image into smaller bins. Instead, when the GPU subsystem operates in the direct rendering mode, the GPU subsystem renders at once the entirety of an image to memory. In some GPU subsystems (e.g., a GPU subsystem on a mobile device), there is not enough graphics memory to hold the entirety of an image of pixel data. Instead, for a direct rendering mode, slower system memory is used to render the image.

As discussed herein, the GPU subsystem may perform graphics processing to render an image. For example, GPU may render an image from a list of graphics primitives, such as points, lines, triangles, quadrilaterals, triangle strips, and the like, and may perform one or more graphics operations on the list of graphics primitives. An image may be a set of pixel data, and the set of pixel data making up an image may be arranged as a rectangle (e.g., a 1920×1080 block of pixel data) or any other suitable arrangement (e.g., a circle, an irregular arrangement, and the like). In some examples, terms such as "frame," "surface," "texture," and the like may be used in place of the term "image," and may also refer to a set of pixel data.

Regardless of the rendering mode in which the operates, the images rendered by the GPU by processing the same graphics data while operating in different rendering modes should be the same. In other words, if the GPU operates in a first rendering mode to render an image based on graphics data, and if the GPU operates in a second rendering mode to render an image based on the same graphics data, the image generated by the GPU subsystem operating in the first rendering mode should be the same as the image generated by the GPU subsystem operating in the second rendering mode (i.e., there is a pixel-by-pixel match between the two images).

However, operational faults in the GPU subsystem may cause the GPU to produce different images when processing the same graphics data multiple times. If the computing device determines that the image rendered by the GPU operating in a first rendering mode to process graphics data is different from the image rendered by the GPU operating in a second rendering mode to process the same graphics data, computing device may therefore determine that an operational fault exists in the GPU subsystem.

The techniques disclosed herein may improve the computing device's ability to ensure data content integrity of the GPU subsystem compared with previous techniques, and may overcome the challenges faced by current GPU subsystems, as discussed above. The techniques disclosed herein may be performed at speed in the field. In other words, the techniques disclosed herein may enable the GPU to perform concurrent and online testing of itself to detect operational faults without entering a dedicated test mode.

Due to the temporal separation between the multiple rendering passes performed by the GPU subsystem, the techniques disclosed herein may potentially be relatively more likely to detect intermittent operational faults or transient operational faults compared with previous techniques. Further, because the GPU subsystem may utilize different busses and/or hardware components both within and external to the GPU when operating in different rendering modes, the techniques disclosed herein may enable the computing device to detect operational faults that occur in the hardware components and/or buses in the GPU subsystem that are external to the GPU.

In addition, because the GPU may utilize both memory internal and external to the GPU when operating in different rendering modes, the techniques disclosed herein enables the computing device to detect permanent and transient faults of memory within the GPU subsystem without the use of error correcting code (ECC) memory and without parity check mechanisms for the memory.

Further, the techniques disclosed herein may minimize the impact in the silicon or die area of an integrated circuit on which the GPU subsystem is implemented (e.g., a system on chip that contains all or portions of the GPU subsystem) because the techniques disclosed herein may minimize the use of additional hardware components to detect operational faults in the GPU subsystem.

The techniques disclosed herein may enable the GPU subsystem to achieve the hardware architectural metrics set out by the ISO 26262 functional safety standard, including both the Single Point Fault Metric (SPFM) and the Latent Point Fault Metric (LPFM).

FIG. 1 is a block diagram of a device configured to perform one or more of the example techniques described in this disclosure. Device 10 may be a computing device located in an automobile or other vehicle. For ease of illustration and brevity, various components of an automobile are not shown or described. Rather, FIG. 1 illustrates the components for performing example techniques described in this disclosure.

Device 10 is not limited to be an automobile. Other examples of device 10 include a computer (e.g., personal computer, a desktop computer, or a laptop computer), a mobile device such as a tablet computer, a wireless communication device (such as, e.g., a mobile telephone, a cellular telephone, a satellite telephone, and/or a mobile telephone handset), a landline telephone for teleconferencing, an Internet telephone, a handheld device such as a portable video game device or a personal digital assistant (PDA). Additional examples of device 10 include a personal music player, a video player, a display device, a camera, a television, a set-top box, a broadcast receiver device, a server, an intermediate network device, a mainframe computer or any other type of device that processes and/or displays graphical data. For purposes of description, the examples are described with respect to device 10 being an automobile with the understanding that the examples may be extended to other examples of device 10.

As illustrated in the example of FIG. 1, device 10 includes lens 12, camera processor 14, a central processing unit (CPU) 16, a graphical processing unit (GPU) 18 and graphics memory 20 of GPU 18, user interface 22, memory controller 24 that provides access to system memory 30, display processor 11, and display interface 26 that outputs signals that cause graphical data to be displayed on one or more displays 28. Bus 32 provides the interconnection of the various components.

Although the various components are illustrated as separate components, in some examples the components may be combined to form a system on chip (SoC). As an example, camera processor 14, CPU 16, GPU 18, display processor 11, and display interface 26 may be formed on a common integrated circuit (IC) chip. In some examples, one or more of camera processor 14, CPU 16, GPU 18, display processor 11, and display interface 26 may be in separate IC chips. Various other permutations and combinations are possible, and the techniques should not be considered limited to the example illustrated in FIG. 1.

The various components illustrated in FIG. 1 (whether formed on one device or different devices) may be formed as at least one of fixed-function or programmable circuitry such as in one or more microprocessors, application specific integrated circuits (ASICs), field programmable gate arrays (FPGAs), digital signal processors (DSPs), or other equivalent integrated or discrete logic circuitry. Examples of graphics memory 20 include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), flash memory, a magnetic data media or an optical storage media.

The various units illustrated in FIG. 1 communicate with each other using bus 32 (also known as "external bus 32"). Bus 32 may be any of a variety of bus structures, such as a third-generation bus (e.g., a HyperTransport bus or an InfiniBand bus), a second-generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different components shown in FIG. 1 is merely exemplary, and other configurations of computing devices and/or other image processing systems with the same or different components may be used to implement the techniques of this disclosure.

One or more displays 28 display pertinent information to the driver or passengers. Examples of one or more displays 28 include a monitor, a liquid crystal display (LCD), a plasma display panel, a light emitting diode (LED) array, a touch panel, and the like.

In some examples, there may be only one display 28 in device 10, such as one large screen that functions as user interface 22 as well as the "dashboard" that displays information such as speed, temperature, gas level, battery level, and other such information, and outputs images captured by camera processor 14. In some examples, there may be a plurality of displays 28. For instance, one of displays 28 may be the dashboard behind the steering wheel, another one of displays 28 may be the screen that shows information such as distance traveled, temperature settings, and the like.

There may be one GPU, like GPU 18, and one display interface, like display interface 26, associated with each one of displays 28, or there may be a single GPU 18 and single display interface 26 for each one of displays 28. In the examples described in this disclosure, there is one GPU 18 and one display interface 26 for each one of displays 28. However, the example techniques are applicable also to where there are multiple ones of GPU 18 and multiple ones of display interface 26.

GPU 18 may be configured to perform graphics operations to render one or more graphics primitives to displays 28. Thus, when one of the software applications executing on CPU 16 requires graphics processing, CPU 16 may provide graphics commands and graphics data to GPU 18 for rendering to displays 28. The graphics data may include, e.g., drawing commands, state information, primitive information, texture information, etc. GPU 18 may, in some instances, be built with a highly-parallel structure that provides more efficient processing of complex graphic-related operations than CPU 16. For example, GPU 18 may include a plurality of processing elements, such as shader units, that are configured to operate on multiple vertices or pixels in a parallel manner. The highly parallel nature of GPU 18 may, in some instances, allow GPU 18 to draw graphics images (e.g., GUIs and two-dimensional (2D) and/or three-dimensional (3D) graphics scenes) onto display 28 more quickly than drawing the scenes directly to displays 28 using CPU 16.

GPU 18 may, in some instances, be integrated into a motherboard of computing device 10. In other instances, GPU 18 may be present on a graphics card that is installed in a port in the motherboard of computing device 10 or may be otherwise incorporated within a peripheral device configured to interoperate with computing device 10. GPU 18 may include one or more processors, such as one or more microprocessors, application specific integrated circuits (ASICs), field programmable gate arrays (FPGAs), digital signal processors (DSPs), or other equivalent integrated or discrete logic circuitry. GPU 18 may also include one or more processor cores, so that GPU 18 may be referred to as a multi-core processor.

GPU 18 may be directly coupled to graphics memory 20. Thus, GPU 18 may read data from and write data to graphics memory 20 without using a bus. In other words, GPU 18 may process data locally using a local storage, instead of off-chip memory. Such graphics memory 20 may be referred to as on-chip memory. This allows GPU 18 to operate in a more efficient manner by eliminating the need of GPU 18 to read and write data via a bus, which may experience heavy bus traffic. In some instances, however, GPU 18 may not include a separate memory, but instead utilize system memory 30 via a bus 32. Graphics memory 20 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media. In some examples, GPU 18 may store a fully formed image in system memory 30, where the image may be one or more surfaces. A surface, in some examples, may be a two-dimensional block of pixels, where each of the pixels may have a color value.

Display processor 11 may include one or more hardware units that retrieves images stored in system memory 30, performs one or more image processing operations on the retrieved images, and outputs the processed images to display(s) 28. In other words, display processor 11 retrieves an image from system memory 30 and may output values that cause the pixels of display(s) 28 to illuminate to display the image. In some examples, display processor 11 may be configured to perform image processing operations on the image retrieved from system memory 30 to be displayed by display(s) 28. Such image processing operations may include format converting, scaling, rotation, blending, and compositing, layering of the image with additional graphics, and the like. In general, display processor 11 may perform some operations that are generally not expected to change the content of images in some use cases (e.g., compositing operations), and may perform other operations that are generally expected to change the content of image in such use cases (e.g., by adjusting hue, saturation, brightness, etc.).

The configuration of display processor 11 in FIG. 1 is exemplary. In other examples, display processor 11 may be configured to receive visual content from any source, such as CPU 16, GPU 18, camera processor 14, or any digital signal process (DSP), video processing unit, image processing unit, pixel processing unit, memory storing visual content, or any other source.

As used herein, the term "visual content" includes but is not limited to any graphics data, graphical data, video data, image data, pixel data, graphics content, graphical content, video content, image content, pixel content, and/or any other type of content that may be displayed.

User interface 22 is used in this disclosure to generically refer to ways in which a driver or passenger may interact with device 10. For instance, user interface 22 may be switches on the side of the steering wheel that the driver may use to cycle through radio stations. User interface 22 may include the gear stick that the driver uses to shift the car into gear or reverse. In some examples, user interface 22 may be part of one or more displays 28, such as in examples where one of displays 28 is a touch panel.

Camera processor 14, CPU 16, and GPU 18 may be configured to generate image content for display by one or more displays 28. For example, camera processor 14 is configured to receive electrical currents as sensor signals from respective pixels of lens 12 and process the electrical currents to generate pixel data of images. One example of lens 12 is the backup camera of an automobile. Camera processor 14 may be configured as a single-input-multiple-data (SIMD) architecture. Camera processor 14 may perform the same operations on current received from each of the sensors on each of lens 12. Each lane of the SIMD architecture may include an image pipeline. The image pipeline includes hardwire circuitry and/or programmable circuitry (e.g., at least one of fixed-function or programmable circuitry) to process the output of the sensors to generate pixel values for pixels to be in a displayed image.

For example, each image pipeline of camera processor 14 may include respective trans-impedance amplifiers (TIAs) to convert the current to a voltage and respective analog-to-digital converters (ADCs) that convert the analog voltage output into a digital value. The current outputted by each pixel indicates the intensity of a red, green, or blue component.

In addition to converting analog current outputs to digital values, camera processor 14 may perform some additional post-processing to increase the quality of the final image. For example, camera processor 14 may evaluate the color and brightness data of neighboring image pixels and perform demosaicing to update the color and brightness of the image pixel. Camera processor 14 may also perform noise reduction and image sharpening, as additional examples. Camera processor 14 outputs the resulting images (e.g., pixel values for each of the image pixels) to system memory 30 via memory controller 24.

CPU 16 may comprise a general-purpose or a special-purpose processor that controls operation of device 10. A user may provide input to device 10 to cause CPU 16 to execute one or more software applications. The software applications that execute on CPU 16 may include, for example, a graphical user interface application or another program. As an example, CPU 16 may execute one or more software applications that generate image content for icons shown on one or more displays 28. As another example, in response to the user placing the automobile in reverse, CPU 16 may execute an application that causes camera processor 14 to process the image content captured by lens 12. As another example, CPU 16 may execute an application that generates image content indicating the battery level, fuel level, temperature, etc.

The above example applications that CPU 16 executes are examples where CPU 16 generates image content for display. However, there may be other example applications that CPU 16 executes that do not generate image content such as the operating system. Furthermore, rather than executing applications to generate the image content, CPU 16 may be hardwired to generate the image content. For instance, rather than executing an application on programmable circuitry to determine the fuel level based on information received from a fuel sensor, CPU 16 may be hardwired to determine the fuel level with specialized fixed-function circuitry that receive information from the fuel sensor and outputs information indicating the fuel level. In some cases, even in such examples, CPU 16 may execute an application that receives the information indicating the fuel level from the fixed-function circuitry and generates graphical commands so that GPU 18 can generate image content showing the fuel level.

There may be various combinations and permutations of using fixed-function and programmable circuitry for CPU 16 to generate information that is to be displayed on one or more displays 28. The above provide some examples, and such examples should not be considered limiting.

The software applications that execute on CPU 16 may include one or more graphics rendering instructions that instruct GPU 18 to cause the rendering of graphics data for storage in system memory 30 and/or for display on display 28. In some examples, the software instructions may conform to a graphics application programming interface (API), such as, e.g., an Open Graphics Library (OpenGL®) API, an Open Graphics Library Embedded Systems (OpenGL ES) API, an OpenCL API, a Direct3D API, an X3D API, a RenderMan API, a WebGL API, or any other public or proprietary standard graphics API. The techniques should not be considered limited to requiring a particular API.

As one example, CPU 16 may determine the miles-per-gallon that the automobile is achieving, and generate graphics rendering instructions that instruct GPU 18 to generate image content showing the miles-per-gallon. As another example, the driver may be reversing the automobile, and in response, CPU 16 may cause one or more displays 28 to display image content capture by lens 12 (e.g., backup camera) and processed by camera processor 14. In addition, CPU 16 may determine angle of movement of the automobile, and generate graphical information showing the path of automobile in reverse. CPU 16 may generate graphics rendering instructions for GPU 18 to draw the path of the automobile that is superimposed on the images processed by camera processor 14. Accordingly, GPU 18 may be configured to generate image content for an automobile application while the automobile is in operation.

Memory controller 24 facilitates the transfer of data going into and out of system memory 30. For example, memory controller 24 may receive memory read and write commands, and service such commands with respect to memory 30 in order to provide memory services for the components in computing device 10. Memory controller 24 is communicatively coupled to system memory 30. Although memory controller 24 is illustrated in the example of device 10 of FIG. 1 as being a processing circuit that is separate from both CPU 16 and system memory 30, in other examples, some or all of the functionality of memory controller 24 may be implemented on one or both of CPU 16 and system memory 30.

System memory 30 may store program modules and/or instructions and/or data that are accessible by camera processor 14, CPU 16, GPU 18, and display processor 11. For example, system memory 30 may store user applications (e.g., instructions for the camera application), resulting images from camera processor 14 and GPU 18, etc. System memory 30 may additionally store information for use by and/or generated by other components of device 10. For example, system memory 30 may act as a device memory for camera processor 14. System memory 30 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some examples, system memory 30 may include instructions that cause camera processor 14, CPU 16, GPU 18, and display interface 26 to perform the functions ascribed to these components in this disclosure. Accordingly, system memory 30 may be a computer-readable storage medium having instructions stored thereon that, when executed, cause one or more processors (e.g., camera processor 14, CPU 16, GPU 18, and display interface 26) to perform various functions.

In some examples, system memory 30 is a non-transitory storage medium. The term "non-transitory" indicates that the storage medium is not embodied in a carrier wave or a propagated signal. However, the term "non-transitory" should not be interpreted to mean that system memory 30 is non-movable or that its contents are static. As one example, system memory 30 may be removed from computing device 10, and moved to another device. As another example, memory, substantially similar to system memory 30, may be inserted into computing device 10. In certain examples, a non-transitory storage medium may store data that can, over time, change (e.g., in RAM).

Camera processor 14, CPU 16, and GPU 18 may store image data, and the like in respective buffers that are allocated within system memory 30. Display interface 26 may retrieve the data from system memory 30 and configure display 28 to display the image represented by the generated image data. In some examples, display interface 26 may include a digital-to-analog converter (DAC) that is configured to convert the digital values retrieved from system memory 30 into an analog signal consumable by display 28. In other examples, display interface 26 may pass the digital values directly to display 28 for processing.

Automobiles operate according to a high-level of safety compliance, and the ISO 26262 is the functional safety standard for road vehicles. Part of the operations of GPU 18, or other processors configured to generate visual content for display, may fall under the safety critical Advanced Driver Assistance Systems (ADAS). One of the ISO 26262 requirements for ADAS is ensuring integrity, typically through online (during operation) self-tests, for various hardware components involved in safety critical use cases, such as GPU 18.

A GPU subsystem of computing device 10 may encompass the processors, memories, buses, and other components of computing device 10 that operates to generate graphical images that are displayed by displays 28. For example, the GPU subsystem of computing device 10 may include GPU 18, graphics memory 20, system memory 30, bus 32. In some examples, the GPU subsystem of computing device 10 may further include display processor 11, camera processor 14, CPU 16, memory controller 24, display interface 26, and displays 28.

This disclosure describes example techniques for concurrent and on-line field testing of hardware components such as GPU 18, graphics memory 20, system memory 30, and bus 32 making up at least a portion of the GPU subsystem. The field tests may be performed while device 10 is in operation (e.g., while a vehicle in which device 10 is embedded is being driven). In general, the techniques of this disclosure include performing the same graphics operation twice (e.g., an operation for rendering or generally producing an image) to render two images using GPU 18 while GPU 18 operates in two different rendering modes. The two images generated by GPU 18 operating in two different operating modes to process the same graphics data may then be compared to determine if the two images match. If the two resulting images do not match, the graphic processing sub-system may identify an error in the GPU subsystem and may issue a warning (e.g., an interrupt).

The techniques of this disclosure may be useful to ensure that the GPU subsystem is operational, without fault, for safety critical automotive applications such as ADAS, or applications like Instrument Cluster display systems, and surround view systems that use GPU 18. The techniques described in this disclosure may provide a systematic methodology to ensure integrity of logic of GPU 18, graphics memory 20, and system memory 30.

Figure 2:
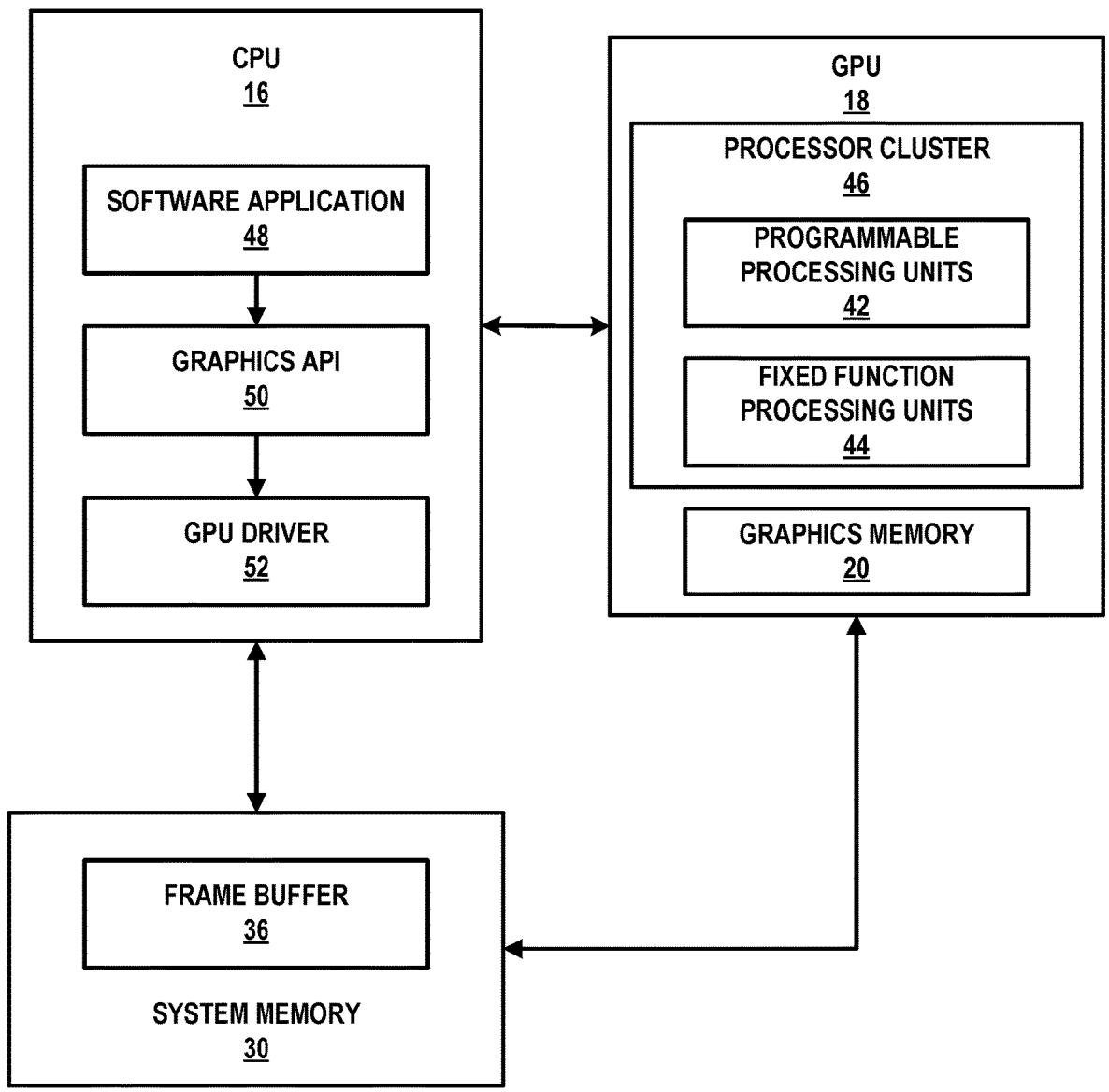
FIG. 2 is a block diagram illustrating an example CPU, GPU, system memory of the example computing device of FIG. 1 in further detail.

FIG. 2 is a block diagram illustrating CPU 16, GPU 18 and system memory 30 of computing device 10 of FIG. 1 in further detail. As shown in FIG. 2, CPU 16 is communicatively coupled to GPU 18 and system memory, such as via bus 32, and GPU 18 is communicatively coupled to CPU 16 and system memory 30, such as via bus 32. GPU 18 may, in some examples, be integrated onto a motherboard with CPU 16. In additional examples, GPU 18 may be implemented on a graphics card that is installed in a port of a motherboard that includes CPU 16. In further examples, GPU 18 may be incorporated within a peripheral device that is configured to interoperate with CPU 16. In additional examples, GPU 18 may be located on the same microchip as CPU 16 forming a system on a chip (SoC). CPU 16 is configured to execute software application 48, graphics API 50, and a GPU driver 52. GPU 18 includes a processor cluster 46 and graphics memory 20.

Software application 48 may be any application that utilizes the functionality of GPU 18. For example, software application 48 may be a GUI application, an operating system, a portable mapping application, a computer-aided design program for engineering or artistic applications, a video game application, or another type of software application that uses 2D or 3D graphics.

Software application 48 may include one or more drawing instructions that instruct GPU 18 to render a graphical user interface (GUI) and/or a graphics scene. For example, the drawing instructions may include instructions that define a set of one or more graphics primitives to be rendered by GPU 18. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software application 48 may issue one or more graphics rendering commands to GPU 18 (e.g., through GPU driver 52) to cause GPU 18 to perform some or all of the rendering of the graphics data. In some examples, the graphics data to be rendered may include a list of graphics primitives, e.g., points, lines, triangles, quadrilaterals, triangle strips, etc. In particular, software application 48 may invoke GPU driver 52, via graphics API 50, to issue one or more commands to GPU 18 for rendering one or more graphics primitives into displayable graphics images. For example, software application 48 may invoke GPU driver 52, via graphics API 50, to provide primitive definitions to GPU 18. In some instances, the primitive definitions may be provided to GPU 18 in the form of a list of drawing primitives, e.g., triangles, rectangles, triangle fans, triangle strips, etc.

The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like.

Based on the instructions issued by software application 48 to GPU driver 52, GPU driver 52 may formulate one or more commands that specify one or more operations for GPU 18 to perform in order to render one or more primitives. GPU driver 52 may also specify the rendering mode in which GPU 18 is to operate, and may include an indication of the rendering mode in which GPU 18 is to operate in the one or more commands that GPU driver 52 formulates and sends to GPU 18. The one or more operations for GPU 18 to perform in order to render one or more primitives as specified by the one or more commands sent from GPU driver 52 to GPU 18 may be referred to as "graphics data" throughout the disclosure. The term "graphics data" that is processed by GPU 18, however, should be understood as not including an indication of the rendering mode in which GPU 18 is to operate. In other words, GPU 18 may process the same graphics data while operating in different rendering modes.

When GPU 18 receives the one or more commands from GPU driver 52 of CPU 16, processor cluster 46 may execute a graphics processing pipeline to decode the command and may configure the graphics processing pipeline to perform the operation specified in the command. For example, a command engine of the graphics processing pipeline may read primitive data and assemble the data into primitives for use by the other graphics pipeline stages in the graphics processing pipeline. After performing the specified operations, GPU 18 outputs the rendered data to frame buffer 36 associated with a display device.

Frame buffer 36 stores destination pixels for GPU 18. Each destination pixel may be associated with a unique screen pixel location. In some examples, frame buffer 36 may store color components and a destination alpha value for each destination pixel. For example, frame buffer 36 may store Red, Green, Blue, Alpha (RGBA) components for each pixel where the "RGB" components correspond to color values and the "A" component corresponds to a destination alpha value that indicates the transparency of the pixel. Frame buffer 36 may also store depth values for each destination pixel. In this way, frame buffer 36 may be said to store an image (e.g., a surface). Although frame buffer 36 and system memory 30 are illustrated as being separate memory units, in other examples, frame buffer 36 may be part of system memory 30. Once GPU 18 has rendered all of the pixels of a frame into frame buffer 36, frame buffer may output the finished frame to display 28 for display.

Processor cluster 46 may include one or more programmable processing units 42 and/or one or more fixed function processing units 44. In some examples, processor cluster 46 may perform the operations of a graphics processing pipeline. Programmable processing unit 42 may include, for example, programmable shader units that are configured to execute one or more shader programs that are downloaded onto GPU 18 from CPU 16. In some examples, programmable processing units 42 may be referred to as "shader processors" or "unified shaders," and may perform geometry, vertex, pixel, or other shading operations to render graphics. The shader units may each include one or more components for fetching and decoding operations, one or more ALUs for carrying out arithmetic calculations, one or more memories, caches, and registers.

GPU 18 may designate programmable processing units 42 to perform a variety of shading operations such as vertex shading, hull shading, domain shading, geometry shading, fragment shading, and the like by sending commands to programmable processing units 42 to execute one or more of a vertex shader stage, tessellation stages, a geometry shader stage, a rasterization stage, and a fragment shader stage in the graphics processing pipeline. In some examples, GPU driver 52 may cause a compiler executing on CPU 16 to compile one or more shader programs, and to download the compiled shader programs onto programmable processing units 42 contained within GPU 18. The shader programs may be written in a high-level shading language, such as, e.g., an OpenGL Shading Language (GLSL), a High-Level Shading Language (HLSL), a C for Graphics (Cg) shading language, an OpenCL C kernel, etc. The compiled shader programs may include one or more instructions that control the operation of programmable processing units 42 within GPU 18. For example, the shader programs may include vertex shader programs that may be executed by programmable processing units 42 to perform the functions of the vertex shader stage, tessellation shader programs that may be executed by programmable processing units 42 to perform the functions of the tessellation stages, geometry shader programs that may be executed by programmable processing units 42 to perform the functions of the geometry shader stage, low resolution z-culling programs that may be executed by programmable processing units 42 to perform low resolution z-culling, and/or fragment shader programs that may be executed by programmable processing units 42 to perform the functions of the fragment shader stage. A vertex shader program may control the execution of a programmable vertex shader unit or a unified shader unit, and include instructions that specify one or more per-vertex operations.

Processor cluster 46 may also include fixed function processing units 44. Fixed function processing units 44 may include hardware that is hard-wired to perform certain functions. Although fixed function processing units 44 may be configurable, via one or more control signals for example, to perform different functions, the fixed function hardware typically does not include a program memory that is capable of receiving user-compiled programs. In some examples, fixed function processing units 44 in processor cluster 46 may include, for example, processing units that perform raster operations, such as, e.g., depth testing, scissors testing, alpha blending, low resolution depth testing, etc. to perform the functions of the rasterization stage of the graphics processing pipeline.

Graphics memory 20 is on-chip storage or memory that is physically integrated into the integrated circuit of GPU 18. In some instances, because graphics memory 20 is on-chip, GPU 18 may be able to read values from or write values to graphics memory 20 more quickly than reading values from or writing values to system memory 30 via a system bus. Thus, GPU 18 may read data from and write data to graphics memory 20 via an internal bus without using an external bus. In other words, GPU 18 may process data locally using a local storage, instead of off-chip memory. Such graphics memory 20 may be referred to as on-chip memory. This allows GPU 18 to operate in a more efficient manner by eliminating the need of GPU 18 to read and write data via an external bus, which may experience heavy bus traffic and associated contention for bandwidth. Graphics memory 20 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

GPU 18 may render a graphics image according to a particular rendering mode, including a tile-based rendering mode and a direct rendering mode. When rendering according to a tile-based rendering mode, GPU 18 may receive one or more commands that specify one or more operations for GPU 18 to perform in order to render a batch of primitives (i.e., one or more primitives) into a resulting graphics image. To render the batch of primitives, GPU 18 may first perform a binning pass (also known as a tiling pass) to subdivide the resulting graphics image into a plurality of smaller portions (e.g., tiles of pixels or bins). During the binning pass, GPU 18 may determine which of the batch of primitives belongs to which tile, such as by performing primitive-bin intersection tests, and may divide the batch of primitives into corresponding bins, so that each bin is associated with the primitives that belongs to a particular tile.

For each of the plurality of bins, processor cluster 46 then performs a rendering pass to render the bin into a tile in graphics memory 20 located locally on GPU 18, including performing a separate graphics processing pipeline to render each tile. Once a tile has been rendered to graphics memory 20, GPU may read the rendered tile from graphics memory 20 and store the tile in a render target, such as frame buffer 36.

During the binning pass, GPU 18 may perform low resolution z-culling to determine, for each primitive in the graphical scene, whether or not the particular primitive is visible in a rendered tile, and may generate a visibility stream that indicates whether each of the primitives may be visible in the finally rendered scene. If GPU 18 determines that the particular primitive will not be visible in a rendered tile, GPU 18 may refrain from performing a rendering pass to render the particular primitive.

As discussed above, graphics memory 20 may be of a size sufficient to hold one tile of the graphics image. Thus, as part of a single rendering pass for a particular portion (i.e., tile) of the image, processor cluster 46 may render all or a subset of the batch of primitives with respect to a particular subset of the destination pixels (e.g., a particular tile of destination pixels) of the image. After performing a first rendering pass (and a first binning pass) with respect to a first tile, processor cluster 46 may perform a second rendering pass (and a second binning pass) with respect to a second tile, and so on, until each tile of the image has been rendered. Processor cluster 46 may incrementally traverse through each of the tiles until the primitives associated with every tile have been rendered.

When rendering according to a direct rendering mode, GPU 18 may similarly receive one or more commands that specify one or more operations for GPU 18 to perform in order to render a batch of primitives (i.e., one or more primitives) into a resulting graphics image. To render the batch of primitives according to the direct rendering mode, processor cluster 46 may execute a graphics processing pipeline to render the entire the graphics image to frame buffer 36 in a rendering pass. In other words, processor cluster 46 may perform a single rendering pass to render the batch of primitives into the resulting graphics image.

In accordance with some aspects of the present disclosure, computing device 10 may utilize the rendering modes of GPU 18 to detect operational faults within the GPU subsystem. In particular, CPU 16 may direct GPU 18 to process the same graphics data multiple times to render multiple images based on the same graphics data while operating in different rendering modes. GPU 18 of a GPU subsystem of computing device 10 may operate in a first rendering mode to render a first image and may operate in a second rendering mode to render a second image. Computing device 10 may detect whether a fault has occurred in the GPU subsystem based at least in part on comparing the first image rendered while operating in the first rendering mode and the second image rendered while operating in the second rendering mode.

In some examples, the first rendering mode may be the tile-based rendering mode and the second rendering mode may be the direct rendering mode. In other examples, the first rendering mode may be the direct rendering mode, and the second rendering mode may be the tile-based rendering mode. In some examples, the first rendering mode and/or the second rendering mode may be any other rendering modes supported by GPU 18.

GPU 18 may receive from CPU 16 a first one or more commands that specify one or more operations for GPU 18 to perform in order to render one or more primitives (i.e., graphics data), along with an indication of the rendering mode in which GPU 18 is to operate in order to process the graphics data to render an image. In response to receiving the first one or more commands from CPU 16, GPU 18 may operate according to the rendering mode indicated by the first one or more commands to process the graphics data to produce an image. For example, if the first one or more commands indicate that GPU 18 is to operate according to a tile-based rendering mode, GPU 18 may operate according to the tile-based rendering mode to process the graphics data to produce the image.

GPU 18 may also receive from CPU 16 a second one or more commands that specify one or more operations for GPU 18 to perform to render one or more primitives (i.e., graphics data), along with an indication of the rendering mode in which GPU 18 is to operate to process the graphics data to render an image. In response to receiving the second one or more commands from CPU 16, GPU 18 may operate according to the rendering mode indicated by the second one or more commands to process the graphics data to render an image. For example, if the second one or more commands indicate that GPU 18 is to operate according to a direct rendering mode, GPU 18 may operate according to the direct rendering mode to process the graphics data to produce the image.

The first one or more commands may specify the same graphics data as the graphics data specified by the second one or more commands. In other words, the graphics data specified by the first one or more commands may be the same as the graphics data specified second one or more commands. However, the first one or more commands may specify a first rendering mode (e.g., tile-based rendering mode) and the second one or more commands may specify a second rendering mode (e.g., direct rendering mode) different form the first rendering mode.

Because GPU 18 receives the same graphics data as part of both the first one or more commands and the second one or more commands, the images rendered by GPU 18 as a result of processing the graphics data should be identical, regardless of the rendering mode in which GPU 18 operates. If the images rendered by GPU 18 are not identical, the computing device 10 can determine that an operational fault has occurred in the GPU subsystem.

In some examples, software application 48 may explicitly invoke GPU driver two times: once to formulate the first one or more commands to send to GPU 18 that specifies GPU 18 to operate according to a tile-based rendering mode, and once to formulate the second one or more commands to send to GPU 18 that specifies GPU 18 to operate according to a direct rendering mode. In other words, software application 48 may explicitly direct GPU 18 to render two images according to two different rendering modes in order to detect operational faults within the GPU subsystem.

In some examples, software application 48 may explicitly invoke GPU driver once. In response, GPU driver 52 may formulate two sets of commands that specify GPU 18 to operate according to two different operating modes. Specifically, GPU driver 52 may formulate the first one or more commands to send to GPU 18 that specifies GPU 18 to operate according to a tile-based rendering mode, and may formulate the second one or more commands to send to GPU 18 that specifies GPU 18 to operate according to a direct rendering mode. In other words, even if software application 48 does not explicitly direct GPU 18 to render two images according to two different rendering modes, GPU driver 52 may nonetheless formulate two sets of commands that direct GPU 18 to operate according to two different operating modes to process the same graphics data to produce two images.

Thus, software application 48 does not need to explicitly direct GPU 18 to render two images according to two different rendering modes in order to detect operational faults within the GPU subsystem. Instead, GPU driver 52 may, in response to being invoked by software application 48 to cause GPU 18 to render an image, formulate two sets of commands, each including the same graphics data, that direct GPU 18 to operate according to two different operating modes to render two images, in order to detect operational faults within the GPU subsystem.

As such, while software application 48 executes at CPU 16 during the normal course of operation of computing device 10, GPU driver 52 may, when invoked to cause GPU 18 to render an image, automatically formulate two sets of commands that specifies GPU 18 to operate according to two different operating modes to render two images by processing the same graphics data. In this way, the techniques disclosed herein enables computing device 10 to perform concurrent and online testing of the GPU subsystem while computing device 10 is powered on and performing its normal functionality without needing to modify software application 48 that executes at CPU 16.

Figure 3A:
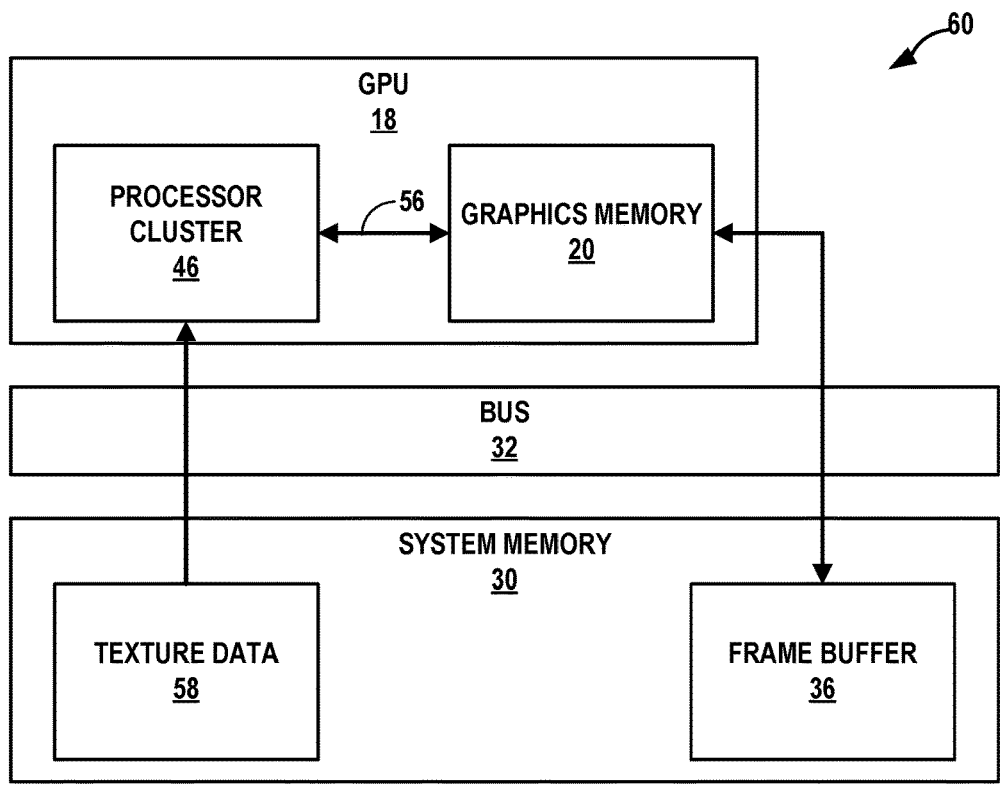
FIG. 3A is a block diagram illustrating an example GPU subsystem when operating in a tile-based rendering mode to render an image.

FIG. 3A is a block diagram illustrating an example GPU subsystem when operating in a tile-based rendering mode to render an image. As shown in FIG. 3A, GPU subsystem 60 may include GPU 18, system memory 30, and bus 32. GPU 18 may include graphics memory 20, processor cluster 46, and internal bus 56.

When GPU 18 of the GPU subsystem operates in a tile-based rendering mode, processor cluster 46 of GPU 18 processes graphics data to produce an image one tile at a time to on-chip graphics memory 20 of GPU 18 via internal bus 56. GPU 18 then transfers the rendered tile from graphics memory 20 to frame buffer 36 via external bus 32.

Processor cluster 46 may perform a graphics pipeline for each tile of the image. When performing the graphics pipeline, processor cluster 46 may read texture data 58 from system memory 30 via external bus 32, and utilize texture data 58 to render the tile (e.g., such as in the rasterization and/or fragment shading stages of the graphics pipeline). Because GPU 18 performs multiple rendering passes in order to render each tile of an image, GPU 18 may access internal bus 56 and graphics memory 20 multiple times to write each rendered tile to graphics memory 20. Similarly, GPU 18 may access external bus 32 multiple times to read each rendered tile from GPU 40 and to write each of the rendered tiles to frame buffer 36. GPU 18 may also perform multiple accesses of texture data 58 stored in system memory 30 via external bus 32 each time it performs a graphics pipeline to render a tile of the image.

Figure 3B:
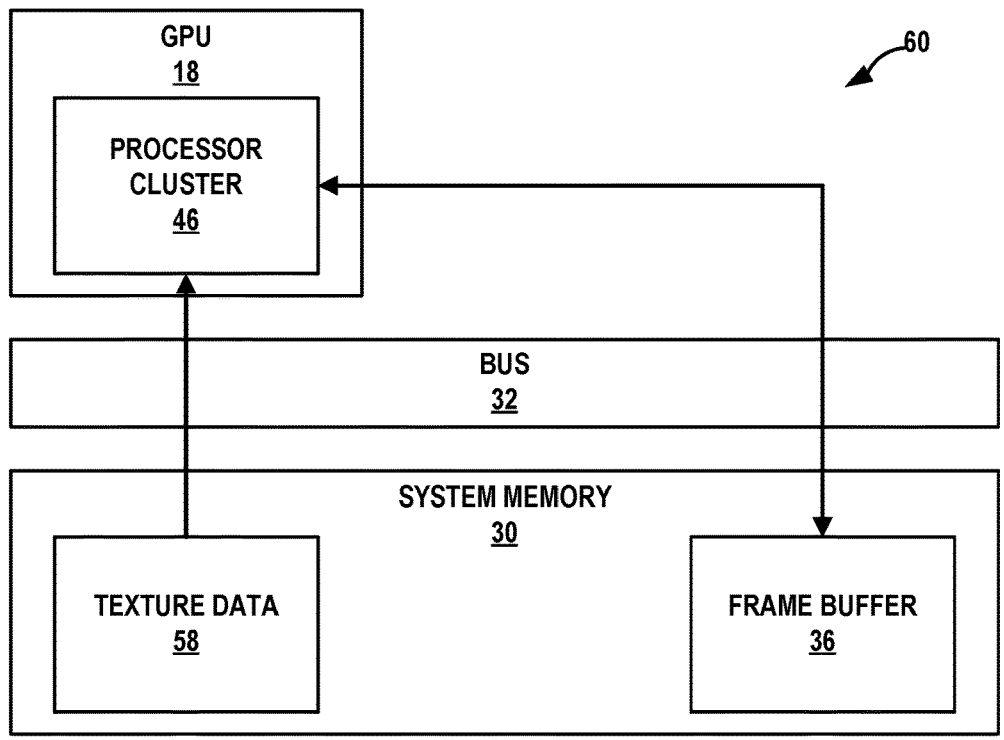
FIG. 3B is a block diagram illustrating an example GPU subsystem when operating in a direct rendering mode to render an image.

FIG. 3B is a block diagram illustrating an example GPU subsystem when operating in a direct rendering mode to render an image. When operating in a direct rendering mode, GPU 18 may process graphics data to render an entirety of an image to frame buffer 36 via external bus 32 without dividing the image into tiles. Processor cluster 46 may perform a graphics pipeline to render the image. When performing the graphics pipeline, processor cluster 46 may read texture data 58 from system memory 30 via external bus 32, and utilize texture data 58 to render the image (e.g., such as in the rasterization and/or fragment shading stages of the graphics pipeline).

In contrast to the tile-based rendering mode, GPU 18 bypasses internal bus 56 and graphics memory 20 when operating in the direct rendering mode, and does not read pixel data from graphics memory 20 that is written to frame buffer 36 via external bus 32. Instead, as shown in FIG. 8B, when the GPU subsystem operates in the direct rendering mode, processor cluster 46 of GPU 18 may read from and write to system memory 30 via system bus 32.

As can be seen from FIGS. 3A and 3B, GPU subsystem 60 utilizes different components and busses of itself when operating in different rendering modes. Computing device 10 may utilize GPU 18 to process the same sets of operations and primitives in different rendering modes to render multiple images, in order to detect operational faults of GPU subsystem 60. For example, GPU 18 may operate in a first rendering mode (e.g., tile-based rendering mode) to render a first image based on a set of operations and primitives, and may operate in a second rendering mode (e.g., direct rendering mode) to render a second image based on the same set of operations and primitives. Computing device 10 (e.g., CPU 16, GPU 18, and/or specialized comparator hardware) may compare the first image rendered by GPU 18 in the first rendering mode with the second image rendered by GPU 18 in the second rendering mode to detect operational faults within GPU subsystem 60.

After processing the graphics data to produce the first and second images (e.g., rendering a frame), and storing the first and second images, GPU (or another processing circuit such as CPU 16) may be configured to compare the two images. As mentioned above, as the two images are produced using the same input data (e.g., graphics data), the two output images (i.e., the first image and the second image) are expected to be the same.

In one example, GPU 18 (or another processing circuit such as CPU 16) may be configured to compare the first image and the second image on a pixel by pixel basis. If any pixel values of the two images are different, a fault may be detected and GPU 18 (or another processing circuit such as CPU 16) may issue an interrupt or otherwise output an indication that a fault has been detected in GPU subsystem 60.

To perform a pixel-by-pixel comparison, GPU 18 (or another processing circuit such as CPU 16) may, for each pixel, determine whether a pixel at a pixel location (e.g., a pixel at pixel location [0,0] in the first image) in the first image matches a corresponding pixel at the same pixel location (e.g., a pixel at pixel location [0,0] in the second image) in the second image. Two pixels may match if they have the same pixel values, such as the same color values (e.g., RGB values, HSV values, YMCK values, and the like). In other words, a pixel of a first image may match a corresponding pixel of the second image if the value of the pixel of the first image matches a corresponding value of the corresponding pixel of the second image. Thus, GPU 18 may compare values of each pixel of the first image to corresponding values of each corresponding pixel of the second image and may determine that an operational fault has occurred in GPU subsystem 60 if at least one pixel of the first image does not match the corresponding value of the corresponding pixel of the second image. Computing device 10 may perform such a comparison for the entire first and second images, or may perform such a comparison for corresponding portions (i.e., less than the entirety) of the first and second images.

In some examples, GPU 18 (or another processing circuit such as CPU 16) may determine that the first image matches the second image even if there is not an exact pixel-by-pixel match between all of the pixels the first image and the second image. For instance, GPU 18 (or another processing circuit such as CPU 16) may deem that the first image matches the second image even if there is not a pixel-by-pixel match between every single pixel of the first image and the second image, as long as the number of pixels that do not match is below a threshold. Such a threshold can be expressed as a percentage of the number of pixels in the first and second images, such as 1%, 5%, and the like. Thus, if the threshold is 1%, then computing device 10 may deem that the first image matches the second image as long as the number of pixels that do not match is below 1% of the number of pixels in the first and second images.

In another example, rather than comparing each of the images on a pixel by pixel basis, GPU 18 (or another processing circuit such as CPU 16) may be configured to compute a data integrity check value for each of the images. GPU 18 may store such data integrity check values in system memory 30 rather than graphics memory 20 or other registers, memory, or internal storage of GPU 18. Such a data integrity check value may be a cyclic redundancy check (CRC) code, a checksum, a hash value or other type of value generated to check the validity of raw data (e.g., image data). A CRC code is an error-detecting code that is often used to detect changes in data. CRCs are generated using cycle codes that produce a value that is a function of one or more characteristics of the raw data (e.g., image data). A hash function is a function that maps data of an arbitrary size to data of a fixed size. Hash functions are sometimes used in a hash table for accelerated lookup of duplicated records. Hash functions may also be used to generate data integrity check values for image data before and after processing. A checksum is data produced by an algorithm operating on data (e.g., image data) in order to detect errors during transmission, processing, or storage. In other examples, such a check value may be a multiple independent signature register (MISR), a linear feedback shift register (LFSR), and the like, though other techniques may be used.

In one example, GPU 18 (or another processing circuit such as CPU 16) may simply compare data check integrity values of the first image and the second image to determine whether or not they are different. GPU 18 (or another processing circuit such as CPU 16) may be configured to generate an interrupt if the data integrity check values of the first image and the second image are different. In other examples, GPU 18 (or another processing circuit such as CPU 16) may be configured to only issue an interrupt if a threshold number of contiguous comparisons (e.g., comparisons of data integrity check values for contiguous frames) in a row all indicate an error. This threshold number of contiguous comparisons may be referred to as a "predetermined margin of error." Accordingly, in this example, the threshold may be the number of contiguous errors detected before GPU 18 (or another processing circuit such as CPU 16) generates an interrupt indicating an error.

In response to the interrupt, computing device 10 may issue an audible, visible, and/or haptic warning to the user. In other examples, in response to the interrupt, computing device 10 may also initiate a self-recovery process (also known as a recovery process) in which error produced by the GPU subsystem may be repaired. The self-recovery process may attempt to recover from the error by, for example, routing data away from a component that produced the error (e.g., away from system memory 30 to another memory in computing device 10, or away from bus 32 to another bus, and the like).

If computing device 10 determines that the first image rendered by GPU 18 in the first rendering mode does not match the second image rendered by GPU 18 in the second rendering mode, when the GPU 18 renders the first and second images based on the same set of operations and primitives, then computing device 10 may determine that an operational fault has occurred in GPU subsystem 60, because GPU 18 should produce the same rendered image when processing the same graphics data, regardless of its rendering mode.

In the example where GPU 18 renders two images by processing the same graphics data, once while operating in the tile-based rendering mode and once while operating in the direct rendering mode, a mismatch between the two rendered images may indicate an operational fault has occurred at internal bus 56, graphics memory 20, external bus 32 between graphics memory 20 and frame buffer 36, and/or external bus 32 between processor cluster 46 and frame buffer 36.

Such operational faults may not be detected if the same image is rendered only once, or if the same image is rendered multiple times by GPU 18 while operating in the same rendering mode. For example, if GPU 18 operates in the same tile-based rendering mode to render images multiple times processing the same graphics data, GPU 18 may produce the same rendered image each time even if an operational fault has occurred at internal bus 56 or graphics memory 20. Similarly, if GPU 18 operates in the same direct rendering mode to render images multiple times processing the same graphics data, GPU 18 may produce the same rendered image each time even if an operational fault has occurred at internal bus 56, graphics memory 20, and/or external bus 32 between processor cluster 46 and frame buffer 36.

Thus, the techniques disclosed herein enables computing device 10 to detect operational faults in GPU subsystem 60 that may potentially be undetectable or relatively harder to detect via other techniques. Further, the techniques disclosed herein enables computing device 10 to detect operational faults in GPU subsystem 60 in a way that minimizes the need to add additional hardware components to detect operational faults that occur in GPU subsystem 60, including operational faults that occur at portions of GPU subsystem 60 external to GPU 18.

GPU 18 (or another processing circuit such as CPU 16) may perform concurrent online testing using the techniques discussed above. In other words, GPU 18 may perform a built-in self-test while GPU 18 is powered-on and rendering images. Because GPU 18 performs the built-in self-test concurrently and online, GPU 18 does not perform the built-in self-test by entering into a dedicated test mode. If GPU 18 determines that, during the built-in self-test, GPU 18 has modified an image in an unexpected way (e.g., a checksum for a first image does not match a checksum for a second image), GPU 18 may determine that one or more hardware units or memories accessible by GPU 18 are not operating properly, and may thereby detect a fault in GPU 18.

The techniques described above allow data integrity to be confirmed without using error-correcting code (ECC) memory, which is often not present in display subsystems, including GPUs. In addition, the techniques of this disclosure may be used during normal system operation without entering a dedicated test mode. Furthermore, the techniques of this disclosure may be implemented with minimal impact to die area of a system on a chip (SoC). Also, the techniques of this disclosure may be implemented and employed at the full processing speed of GPU 18 (or another processor). That is, the data integrity checks may occur concurrently with actual operation of computing device 10. The data integrity checks of this disclosure are able to detect both permanent faults and intermittent faults because data integrity testing may be done concurrently and online. In addition, the data integrity checks of this disclosure may enable vehicle manufacturers and vehicle systems manufacturers to achieve hardware architectural metrics as per ISO 26262 functional safety standard (Single Point Fault Metric (SPFM) and Latent Point Fault Metric (LPFM)).

Figure 4:
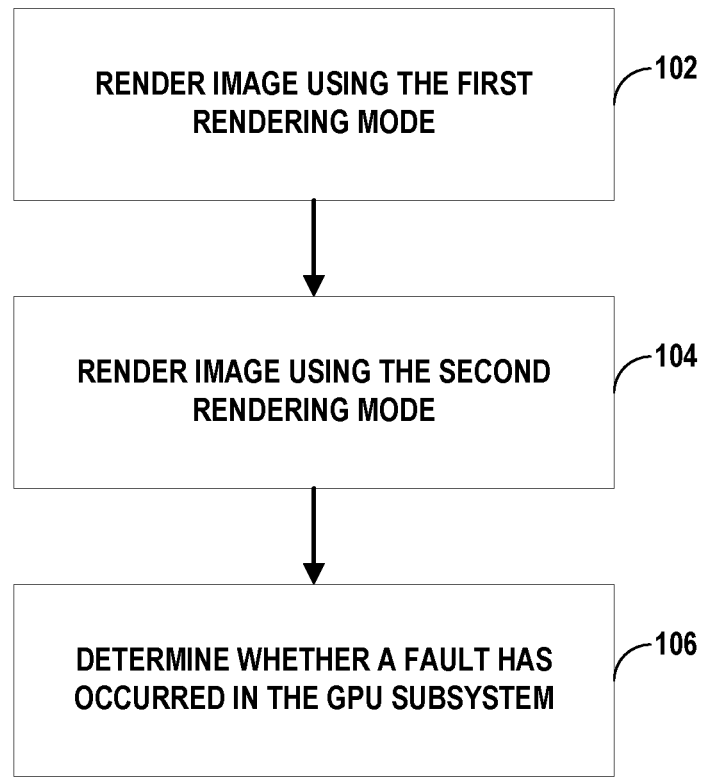
FIG. 4 is a flow chart illustrating an example operation of computing device 10 in further detail.

FIG. 4 is a flow chart illustrating an example operation of computing device 10 in further detail. GPU 18 may receive one or more commands issued by CPU 16 that specifies a first rendering mode in which GPU 18 is to operate to process graphics data to render an image. A software application, such as software application 48, may invoke GPU driver 52 to issue one or more commands to GPU 18 to render the image. In response, GPU driver 52 may generating a command stream that provides instructions for GPU 18 for processing the set of operations and the set of primitives to render the image that may be stored in frame buffer 36 (e.g., "graphics data"). Such instructions may be executed by processor cluster 46 perform the set of operations on the set of primitives to render the image.

In some examples, software application 48, when invoking GPU driver 52, may direct GPU driver 52 to specify the rendering mode in which GPU 18 is to operate in order to render the image. In other examples, software application 48 may not specify the rendering mode in which GPU 18 is to operate to render the image. Instead, GPU driver 52 may determine the rendering mode in which GPU 18 is to operate, and may include an indication of the rendering mode in which GPU 18 is to operate in the command stream that GPU driver 52 sends to GPU 18. For example, GPU 18 may receive one or more commands from GPU driver 52 that includes the graphics data as well as an indication that GPU 18 is to operate in a first rendering mode. The first rendering mode may be a tile-based rendering mode, a direct rendering mode, or another rendering mode.

As shown in FIG. 4, in response to receiving the one or more commands issued by GPU driver 52 to process the graphics data while operating in the first rendering mode to render an image, GPU 18 may operate in the first rendering mode, as indicated in the one or more commands issued by GPU driver 52, to process the graphics data to produce a first image (102). Processor cluster 46 may process the graphics data to render the first image into frame buffer 36 or another render target.

GPU 18 may receive one or more commands issued by CPU 16 that specifies a second rendering mode in which GPU 18 is to operate to process graphics data to render an image. The graphics data included in the one or more commands issued by CPU 16 may be the same graphics data included in the one or more commands issued by CPU 16 in step 102. A software application, such as software application 48, may invoke GPU driver 52 to issue one or more commands to GPU 18 to render the image. In response, GPU driver 52 may generating a command stream that provides instructions for GPU 18 for processing graphics data to render the image that may be stored in frame buffer 36. Such instructions may be executed by processor cluster 46 process the graphics data to render the image.

In some examples, software application 48, when invoking GPU driver 52, may direct GPU driver 52 to specify the rendering mode in which GPU 18 is to operate in order to render the image. In other examples, software application 48 may not specify the rendering mode in which GPU 18 is to operate to render the image. Instead, GPU driver 52 may determine the rendering mode in which GPU 18 is to operate, and may include an indication of the rendering mode in which GPU 18 is to operate in the command stream that GPU driver 52 sends to GPU 18. For example, GPU 18 may receive commands from GPU driver 52 that indicates GPU 18 is to operate in a second rendering mode. The second rendering mode may be a tile-based rendering mode, a direct rendering mode, or another rendering mode.

In response to receiving the one or more commands issued by GPU driver 52 to process the graphics data to render the image while operating in the second rendering mode, GPU 18 may operate in the second rendering mode, as indicated in the commands issued by GPU driver 52, to process the graphics data to produce a second image (104). Processor cluster 46 may process the graphics data to render the second image into frame buffer 36 or another render target.

Frame buffer 36 may contain multiple buffers or render targets for separately storing the first and second images rendered by GPU 18. Thus, the second image stored into frame buffer 36 does not overwrite the first image in frame buffer 36, and vice versa. Further, the fact that the first and second images are both rendered into frame buffer 36 does not necessarily mean that the first and second images are displayed by display 28. Instead, computing device 10 may determine whether one of, both of, or none of the first and second images are displayed by display 28.

As discussed above, GPU driver 52 may issue a first set of commands to GPU 18 to process graphics data to produce a first image while operating in a first rendering mode, and may issue a second set of commands to GPU 18 to process graphics data to produce a second image while operating in a second rendering mode different from the first rendering mode. In some examples, software application 48 may include explicit instructions to use GPU 18 to render images based on the same sets of operations and primitives when operating in a first rendering mode and again in a second rendering mode. When CPU 16 executes these instructions, GPU driver 52 may be invoked twice in order to issue to GPU 18 a first set of commands and a second set of instructions. The first set of commands may specify a set of operations and primitives that GPU 18 is to process while operating in a first rendering mode, and a second set of commands may specify the same set of operations and primitives that GPU 18 is to process while operating in a second rendering mode.

In other examples, software application 48 may include instructions to use GPU 18 to render images that does not specify the rendering mode in which GPU 18 is to operate, and does not specify that GPU 18 is to operate in multiple different rendering modes to render multiple images. In these examples, when CPU 16 executes these instructions and invokes GPU driver 52, GPU driver 52 may determine the rendering mode in which GPU 18 is to operate, as well as whether GPU 18 is to operate in multiple different rendering modes to process the graphics data multiple times. Thus, in response to being invoked by software application 48, GPU driver 52 may issue a first set of commands that specify graphics data that GPU 18 is to process while operating in a first rendering mode, and may issue a second set of commands that specify graphics data that GPU 18 is to process while operating in a second rendering mode.

As such, GPU driver 52 may be able to transparently determine whether to test the GPU subsystem for operational faults without having to modify software application 48 that uses GPU 18 to render graphics data. Instead, when software application 48 invokes GPU driver 52 to send commands to GPU 18 to render graphics data, GPU driver 52 may formulate two sets of commands to GPU 18, where the first set of commands direct GPU 18 to operate in a first rendering mode and the second set of commands direct GPU 18 to operate in a second rendering mode to render images from the same sets of instructions and primitives.

Computing device 10 may detect whether a fault has occurred in GPU subsystem 60 based at least in part on comparing the first image with the second image to determine whether the first and second images match (106). Such a comparison of the first and second images may be performed by CPU 16, GPU 18, a combination of CPU 16 and GPU 18, a display processor, other hardware components or logic circuitry of computing device 10, and the like. In some examples, computing device 10 may determine that the first image matches the second image if there is an exact (100%) pixel-by-pixel match between all of the pixels of the first image and the second image.

In other examples, computing device 10 may determine that the first image matches the second image even if there is not an exact pixel-by-pixel match between all of the pixels the first image and the second image. For instance, computing device 10 may deem that the first image matches the second image even if there is not a pixel-by-pixel match between every single pixel of the first image and the second image, as long as the number of pixels that do not match is below a threshold. Such a threshold can be expressed as a percentage of the number of pixels in the first and second images, such as 1%, 5%, and the like. Thus, if the threshold is 1%, then computing device 10 may deem that the first image matches the second image as long as the number of pixels that do not match is below 1% of the number of pixels in the first and second images.

In another example of the disclosure, computing device 10 is configured to generate a first data integrity check value for the first image, and generate a second data integrity check value for the second image. Computing device 10 is further configured to compare the first data integrity check value to the second data integrity check value, and determine whether the first data integrity check value matches the second data integrity check value. In one example, the first data integrity check value and the second data integrity check value is one of a cyclic redundancy check (CRC) code, a hash function, a checksum, or a multiple independent signature register (MISR) signature.

In response to determining that the first image matches the second image, computing device 10 may determine that an operational fault has not occurred in GPU subsystem 60 and may determine that data integrity has been maintained in GPU subsystem 60. Because data integrity has been maintained in GPU subsystem 60, the first and second images rendered by GPU 18 has not been corrupted. Thus, CPU 16 may output one of the first and second images to display 28 for display.

On the other hand, in response to determining that the first image does not match the second image, computing device 10 may determine that an operational fault has occurred in GPU subsystem 60, and consequently that data integrity has not been maintained in GPU subsystem 60. Thus, CPU 16 and/or GPU 18 may report an error or issue an interrupt, such as to a safety processor of computing device 10, to alert computing device 10 of the breach in data integrity. CPU 16 and/or GPU 18 may generate one or more of an auditory, visual, or haptic warning in response to generating the interrupt. In this way, computing device 10 may be alerted when an operational error occurs in GPU subsystem 60.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

The invention claimed is:

1. A method for testing of a graphics processing unit (GPU) subsystem of a computing device, the method comprising:
   processing, by a GPU operating in a first rendering mode, graphics data to produce a first image, wherein the GPU subsystem comprises the GPU and the first rendering mode comprises a tile-based rendering mode;
   processing, by the GPU operating in a second rendering mode, the graphics data to produce a second image, wherein the second rendering mode comprises a direct rendering mode; and
   determining whether a fault has occurred in the GPU subsystem based at least in part on comparing the first image with the second image.

2. The method of claim 1, wherein processing, by the GPU operating in the tile-based rendering mode, the graphics data to produce the first image further comprises:
   dividing, by the GPU, the graphics data into a plurality of bins;
   for each bin of the plurality of bins:
      rendering, by the GPU via an internal bus, the respective bin to a tile in graphics memory; and
      storing, by the GPU via an external bus, the tile from the graphics memory to a frame buffer.

3. The method of claim 1, wherein processing, by the GPU operating in the direct rendering mode, the graphics data to produce the second image further comprises:
   rendering, by the GPU via an external bus, the second image into a frame buffer without dividing the graphics data into a plurality of bins.

4. The method of claim 1, wherein:
   the GPU operates in the tile-based rendering mode in response to receiving a first one or more commands to operate in the tile-based rendering mode; and
   the GPU operates in the direct rendering mode in response to receiving a second one or more commands to operate in the direct rendering mode.

5. The method of claim 1, wherein determining whether a fault has occurred in the GPU subsystem based at least in part on comparing the first image and the second image further comprises:
   comparing, by the computing device, values of each pixel of the first image to corresponding values of each corresponding pixel of the second image; and
   determining, by the computing device, that an operational fault has occurred in the GPU subsystem if a value of at least one pixel of the first image does not match the corresponding value of the corresponding pixel of the second image.

6. The method of claim 1, wherein determining whether a fault has occurred in the GPU subsystem based at least in part on comparing the first image and the second image further comprises:
   generating, by the computing device, a first data integrity check value for the first image;
   generating, by the computing device, a second data integrity check value for the second image;
   comparing, by the computing device, the first data integrity check value to the second data integrity check value; and
   determining, by the computing device, that an operational fault has occurred in the GPU subsystem if the first data integrity check value and the second data integrity check value do not match within a predetermined margin of error.

7. The method of claim 6, wherein the first data integrity check value and the second data integrity check value are one of a cyclic redundancy check (CRC) code, a hash function, a checksum, or a multiple independent signature register (MISR) signature.

8. The method of claim 1, further comprising:
   generating, by the computing device, an interrupt in response to determining that an operational fault has occurred in the GPU subsystem.

9. The method of claim 8, further comprising:
   generating, by the computing device, one or more of an auditory, visual, or haptic warning in response to generating the interrupt.

10. The method of claim 8, further comprising:
    initiating, by the computing device, a recovery process in response to generating the interrupt.

11. The method of claim 1, wherein the GPU subsystem is part of an advanced driver assistance system (ADAS) of a vehicle.

12. An apparatus configured for graphics processing, the apparatus comprising:
a graphics processing unit (GPU) subsystem comprising one or more memories and a GPU in communication with the one or memories, the GPU being configured to:
operate in a first rendering mode to process graphics data to produce a first image wherein the first rendering mode comprises a tile-based rendering mode;
store the first image in the one or more memories;
operate in a second rendering mode to process the graphics data to produce a second image, wherein the second rendering mode comprises a direct rendering mode;
store the second image in the one or more memories; and
determine whether a fault has occurred in the GPU subsystem based at least in part on comparing the first image with the second image.

13. The apparatus of claim 12, wherein the GPU being configured to operate in the tile-based rendering mode comprises the GPU being configured to:
divide the graphics data into a plurality of bins; and
for each bin of the plurality of bins:
render, via an internal bus, the respective bin to a tile in graphics memory of the GPU; and
store the tile from the graphics memory to the one or more memories.

14. The apparatus of claim 12, wherein the GPU being configured to operate in the direct rendering mode comprises the GPU being configured to:
render the second image into the one or more memories without dividing the graphics data into a plurality of bins.

15. The apparatus of claim 12, wherein:
the GPU is configured to operate in the tile-based rendering mode in response to receiving a first one or more commands to operate in the tile-based rendering mode; and
the GPU is configured to operate in the direct rendering mode in response to receiving a second one or more commands to operate in the direct rendering mode.

16. The apparatus of claim 12, wherein the GPU is further configured to:
compare values of each pixel of the first image to corresponding values of each corresponding pixel of the second image; and
determine that an operational fault has occurred in the GPU subsystem if a value of at least one pixel of the first image does not match the corresponding value of the corresponding pixel of the second image.

17. The apparatus of claim 12, wherein the GPU is further configured to:
generate a first data integrity check value for the first image;
generate a second data integrity check value for the second image;
compare the first data integrity check value to the second data integrity check value; and
determine that an operational fault has occurred in the GPU subsystem if the first data integrity check value and the second data integrity check value do not match within a predetermined margin of error.

18. The apparatus of claim 17, wherein the first data integrity check value and the second data integrity check value are one of a cyclic redundancy check (CRC) code, a hash function, a checksum, or a multiple independent signature register (MISR) signature.

19. The apparatus of claim 12, wherein the GPU is further configured to:
generate an interrupt in response to determining that an operational fault has occurred in the GPU subsystem.

20. The apparatus of claim 19, wherein the GPU is further configured to:
generate one or more of an auditory, visual, or haptic warning in response to generating the interrupt.

21. The apparatus of claim 19, wherein the GPU is further configured to:
initiate a recovery process in response to generating the interrupt.

22. The apparatus of claim 12, wherein the GPU subsystem is part of an advanced driver assistance system (ADAS) of a vehicle.

23. An apparatus configured for graphics processing, the apparatus comprising:
means for operating in a first rendering mode to process graphics data to produce a first image, wherein the first rendering mode comprises a tile-based rendering mode;
means for operating in a second rendering mode to process the graphics data to produce a second image, wherein the second rendering mode comprises a direct rendering mode;
means for determining whether a fault has occurred based at least in part on comparing the first image with the second image.

24. The apparatus of claim 23, wherein the means for determining whether the fault has occurred based at least in part on comparing the first image with the second image further comprises:
means for comparing values of each pixel of the first image to corresponding values of each corresponding pixel of the second image; and
means for determining that an operational fault has occurred in a graphics processing unit (GPU) subsystem if a value of at least one pixel of the first image does not match the corresponding value of the corresponding pixel of the second image.

25. The apparatus of claim 23, wherein the means for determining whether the fault has occurred based at least in part on comparing the first image with the second image further comprises:
means for generating a first data integrity check value for the first image;
means for generating a second data integrity check value for the second image;
means for comparing the first data integrity check value to the second data integrity check value; and
means for determining that an operational fault has occurred in a graphics processing unit (GPU) subsystem if the first data integrity check value and the second data integrity check value do not match within a predetermined margin of error.

26. A non-transitory computer-readable storage medium storing instructions that, when executed, cause one or more processors to:
operate in a first rendering mode to process graphics data to produce a first image wherein the first rendering mode comprises a tile-based rendering mode;
operate in a second rendering mode to process the graphics data to produce a second image, wherein the second rendering mode comprises a direct rendering mode; and determine whether a fault has occurred based at least in part on comparing the first image with the second image.

27. The non-transitory computer-readable storage medium of claim 26, wherein to determine whether the fault has occurred, the instructions, when executed, further cause the one or more processors to:
generate a first data integrity check value for the first image;
generate a second data integrity check value for the second image;
compare the first data integrity check value to the second data integrity check value; and
determine that an operational fault has occurred if the first data integrity check value and the second data integrity check value do not match within a predetermined margin of error.

* * * * *